Figure 1:
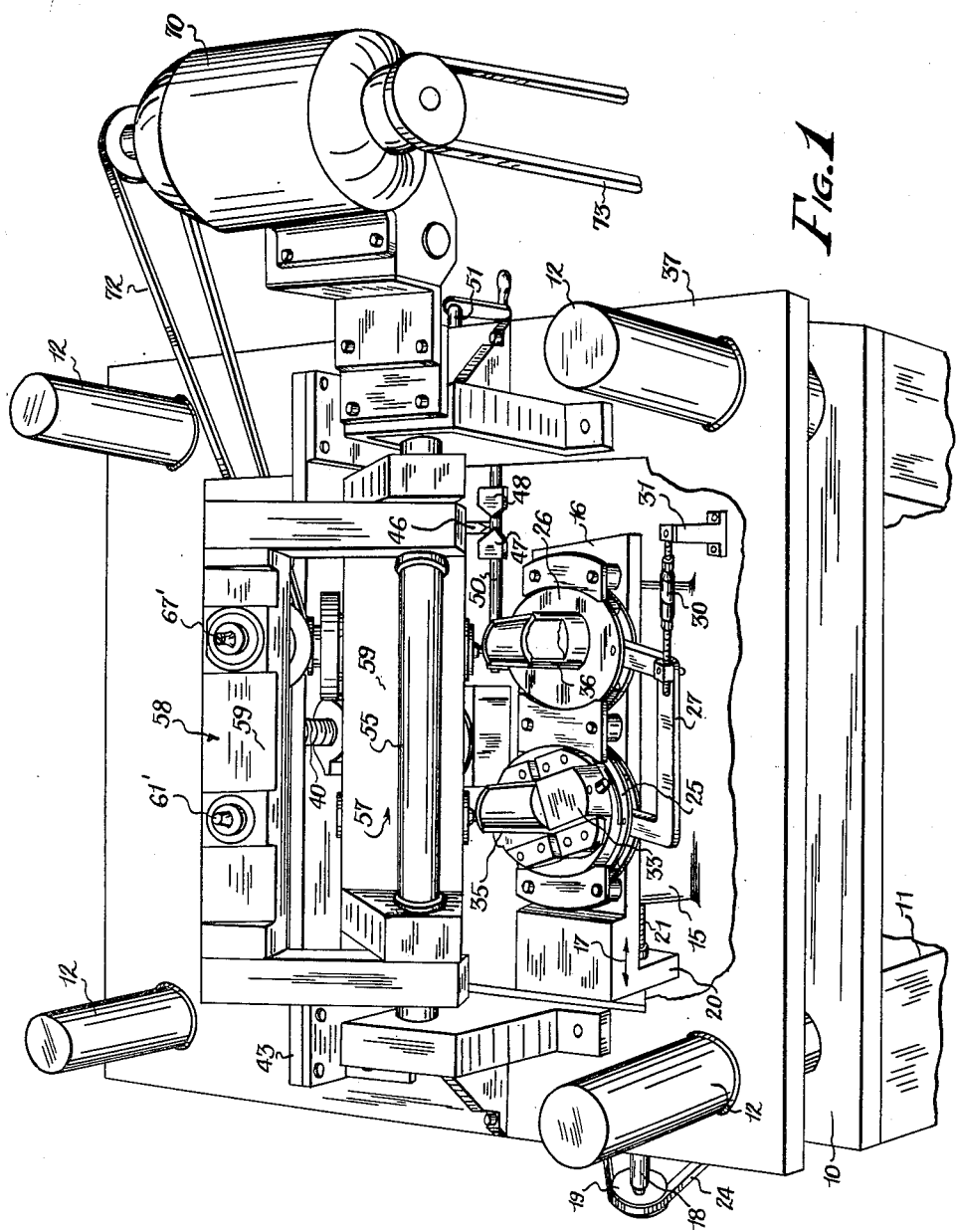

June 1, 1954 J. H. BREISCH 2,679,786
METHOD AND APPARATUS FOR DUPLICATING MACHINED PARTS
Filed June 2, 1951 2 Sheets-Sheet 1

INVENTOR.
JOHN H. BREISCH
BY Hudson, Boughton,
Williams, David & Hoffmann.
ATTORNEYS June 1, 1954  J. H. BREISCH  2,679,786
METHOD AND APPARATUS FOR DUPLICATING MACHINED PARTS
Filed June 2, 1951  2 Sheets-Sheet 2

INVENTOR.
JOHN H. BREISCH
BY Hudson, Doughton,
Williams, David & Hoffmann.
ATTORNEYS Patented June 1, 1954

2,679,786

UNITED STATES PATENT OFFICE 2,679,786

METHOD AND APPARATUS FOR DUPLICATING MACHINED PARTS

John H. Breisch, Lakewood, Ohio, assignor to Lake Shore Industries, Inc., Cleveland, Ohio, a corporation of Ohio Application June 2, 1951, Serial No. 229,636

3 Claims. (Cl. 90—13.3)

The present invention relates to a method and apparatus for duplicating machined pieces, particularly relatively thin pieces, such as turbine blades.

Turbine blades, such as those used in jet engines, must be precisely formed, and it is the practice to manufacture these blades from forged or cast blanks which are machined to the precise dimensions and contours required. The finished blades are relatively thin, and heretofore accurate machining thereof has been difficult, and therefore quite expensive due to the contours of the blades and the resilient character thereof.

The principal object of the present invention is the provision of a new and improved method and apparatus for accurately machining relatively thin blade-like pieces, such as turbine blades, to the required accuracy and with a considerable reduction in cost over production methods used prior to this invention.

A more specific object of the invention is the provision of a new and improved method of machining relatively thin blades which comprises simultaneously cutting opposite faces of the blades by cutting tools substantially diametrically opposite one another whereby one tool forms a backing for the blade portion being worked on by the other tool, and controlling relative movements between the blade and tools to machine the surfaces desired to the required contour and thickness. In the preferred form of the invention, the lines of pressure of the cutting tools against the blade surfaces are maintained in a plane substantially normal to the portions of the blade being machined at any given time.

Another object of the present invention is the provision of a new and improved apparatus which has a support for a blank to be machined, a pair of oppositely disposed cutting tools carried on individual support members which are arranged to move toward and from opposite sides of the work blank, respectively, to control the cutting depth of the tools, means to control movement of the members to and from the work blank, and means to move the work blank and tool holding members relative to one another to cause the tools to progressively cut or machine continuous surfaces on opposite sides of the work blank and form a blade of predetermined thickness and contour.

Still another object of the invention is the provision of a new and improved apparatus of the character referred to in which the cutting tool holder members are biased toward one another and are controlled by a stylus on each of the members, which styli engage opposite sides of a master blade or template supported in spaced relation to the work blank and which has a contour corresponding to that of the finished blade.

Figure 2:
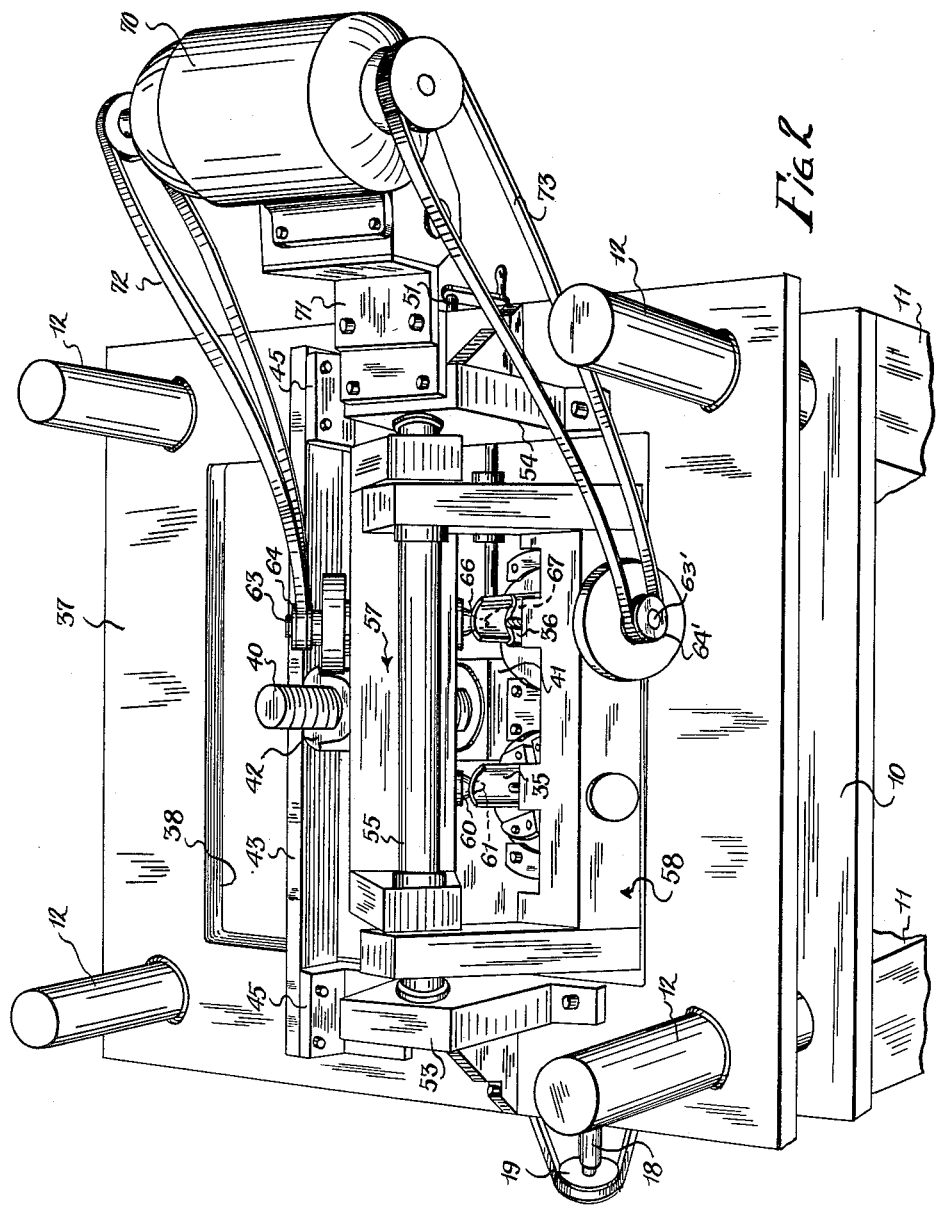

The invention resides in certain constructions and combinations and arrangements of parts and further objects and advantages will be apparent to those skilled in the art to which it relates from the following description of the preferred embodiment described with reference to the accompanying drawings forming a part of this specification, in which:

Fig. 1 is a perspective view of an apparatus for duplicating turbine blades, part of which apparatus is shown broken away; and Fig. 2 is a view similar to Fig. 1 but showing certain parts of the apparatus in different positions.

In its preferred form, the invention is embodied in an apparatus for duplicating turbine blades and the like, although the invention could be embodied in apparatus for duplicating other articles having thin sections. Referring to the drawings, the apparatus comprises a base plate 10, which is supported by legs or blocks 11, and has four upright guide posts 12 adjacent the corners thereof. The central portion of the plate 10 has a hollow block formation 15 on which a slide 16 is adapted to be guided for longitudinal reciprocation, as indicated by the double arrow 17.

The slide 16 is reciprocated by suitable mechanism including a shaft 18, one end of which is journaled in one end of the block 15 and the opposite end of which is journaled in a bearing, not shown, and is driven by a pulley 19. The shaft 18 extends through an opening through a portion 20 of the slide 16, which projects downwardly at one end of the slide, and has a reversely threaded portion 21 which cooperates with a part on the portion 20 to cause the slide to reciprocate when the shaft is rotated. The pulley 19 is driven by a belt 24 connected with a suitable power drive, not shown, so that the slide is caused to reciprocate slowly.

A pair of rotatable chucks 25, 26 are journaled on the slide 16 and are preferably arranged to be oscillated as the slide 16 reciprocates. In the form shown, the mechanism for oscillating the chucks comprises a yoke 27 the legs of which are pivotally connected to the respective chucks and one end of which is pivotally connected to a link 30 which is attached to a post 31 secured to the plate 10. Preferably, the length of the link 30 can be adjusted. It will be seen that as the slide 16 reciprocates the yoke causes the chucks to oscillate. The purpose of oscillating the chucks 25, 26 is described more fully hereinafter and in some instances it may be desirable to omit the yoke 27 and to cause the chucks to remain stationary on their pivots.

The chuck 25 has suitable mechanism 33 by which a template or a master turbine blade 35 can be rigidly attached thereto. The chuck 26 is also provided with suitable clamping means, not shown, for similarly attaching a blank workpiece 36 thereto.

An upper frame or plate 37, having a rectangular opening 38 therethrough, is supported for vertical movement above the plate 10 and it has openings adjacent to the corners thereof through which the guide posts 12 extend to guide the plate relative to the base plate 10. Plate 37 is moved on the guides by a screw 40 which is rotatably supported in a bearing block 41 on the plate 10 and which threadingly receives a nut 42 which is attached to a bar 43 secured to the plate 37 by brackets 45. It will be seen that when the screw 40 is rotated in one direction or the other the plate 37 is moved toward or from the base plate 10.

The screw 40 is rotated step by step to lower the plate 37 by a suitable power and ratchet mechanism actuated in timed relation with the reciprocation of the slide 16. The mechanism includes a spring pressed finger or slide 46 moved in opposite directions by wedge blocks 47, 48 which are attached in spaced relation to a rod 50, one end of which rod is slidably supported in suitable guides on the plate 10 and the other end of which is attached to the slide 16. As the slide approaches the ends of its strokes the finger 46 is engaged and moved to the rear by one or the other of the blocks 47, 48 and when so moved causes a pawl carried thereby to rotate a ratchet wheel on the shaft 51 which shaft in turn rotates the screw 40 slightly in one direction through a worm and worm wheel drive. By this arrangement the plate 37 is lowered by slight increments or steps at the end of each stroke of the slide 16. The screw 40 can be manually rotated by rotation of the shaft 51 having a crank thereon to quickly move the frame plate 37 from the base plate 10.

The plate 37 has blocks 53, 54 attached thereto at opposite ends of the opening 38 and these blocks support a rod 55 extending therebetween. Two U-shaped cutting tool holding members 57, 58 have bushings in the ends of the legs thereof which are pivotally journaled on the rod 55 so that the members may swing freely on the rod. The members 57, 58 include yoke portions 59, and the members are disposed so that the yoke portions thereof lie on opposite sides of the template 35 and the work blank 36 supported by the chucks 25, 26, respectively, as seen in Fig. 2. The member 57 has a chuck 60 by which a suitable stylus 61 can be attached thereto, and normally the weight of the member 57 urges the stylus 61 to engage with the far side of the template 35.

The member 57 is also provided with a spindle 63 having a drive pulley 64 thereon, and the spindle has a suitable chuck 66 by which a cutting tool 67 is drivingly attached to the spindle. The cutting tool 67 is preferably shaped like the stylus 61 and is adapted to cut material from the blank workpiece 36 as the workpiece is translated by the slide 16 relative to the cutting tool.

Member 58 is likewise provided with a stylus 61' and a cutting tool spindle 63', driven by a pulley 64', and having a chuck by which a cutting tool 67' can be attached to the spindle. The pulleys 64, 64' are driven by an electric motor 70, which is supported by a bracket 71 attached to the block 54, through belts 72, 73. In the preferred form, the spacing between the axes of the styli 61, 61' and the axes of the cutting tools 67, 67', respectively, is equal to the spacing between the axes of the chucks 25, 26 and the tips of the stylus and tool carried by the respective members 57, 58 lie in a common plane which is parallel to the direction of movement of the slide 16. By the construction described it will be seen that the areas of the workpiece 36 engaged by the tips of the cutting tools 67, 67' and any given time will correspond to the areas of the master blade 35 aligned with or engaged by the tips of the respective styli, and the spacing between the opposed tool tips will be equal to that between the opposed tips of the styli.

The axes of the styli preferably lie in a common plane normal to the direction of movement of the slide 16, as do the axes of the cutting tools. The weight of the members 57, 58 urge the cutting tools 67, 67' against opposite surfaces of the work blank 36, and the force of one tool on the workpiece is counteracted by the force of the opposite tool.

To operate the apparatus, belt 73 is disconnected from the pulley 64' and member 58 is raised upwardly and over center to the position shown in Fig. 1 for gaining access to the chucks 25, 26. The template or master blade 35, which is a precisely formed blade which is desired to be duplicated, is attached to the chuck 25 while the slide is at one end of its stroke and is positioned with the outer end of the blade upwardly and with the arcuate portion thereof substantially normal to the plane of the axes of the styli. The forged or cast blank or workpiece 36 having the general form of the master blade 35 but oversized is attached to the chuck 26 in a position relative to the cutting tools corresponding to the position of blade 35 relative to the styli.

It will be seen that the template blade 35 has an arcuate cross section, and the yoke 27 is of such dimensions that the chucks 25, 26 are rotated about their pivots as the slide 16 is reciprocated so that the arcuate surfaces of the blades are maintained substantially normal to the vertical plane containing the axes of the styli and cutting tools, respectively, throughout the movement thereof by the slide 16.

When the template and work blank are in place, the member 58 is lowered and the belt 73 connected with the spindle 64'. The screw 40 is rotated by rod 51 to bring plate 37 to a position in which the cutting tools 67, 67' and styli 61, 61' engage the upper edges of the work blank and template blade, respectively. Motor 70 is then energized to drive the cutting tools and at the same time the drive for the rod 18 is started. As the slide 16 slowly moves the work blank and template, the cutting tools 67, 67' cut away the excess material of the work blank and the weight of members 57, 58 moves the cutting tools toward one another until the stylus of each of these members engages the template blade. The inward movements of the members 57, 58 are thus controlled so that the depth of the cuts into the work blank is exactly that required to machine the blank to a thickness corresponding to that of the template at corresponding areas. When the slide 16 has moved through one of its strokes the cutting tools will have cut a narrow segment transversely of the blank 36 and at the conclusion of the cutting stroke the screw 40 is rotated slightly to lower the plate 37 and bring the cutting tools in alignment with the next lower segment on the work blank. This operation is continued automatically until the entire area of the work blank to be machined has been subjected to the cutting tools.

As mentioned previously, in the form of the invention shown, the work blank is rotated as it is translated relative to the cutting tools so that the tools engage the blank with the axes thereof lying in the plane substantially normal to the arcuate formation of the finished blade. This minimizes distortion of the work blank and thereby provides maximum accuracy in the formation of the blade. In the event flat blades are to be formed, the chucks 25, 26 would be fixed relative to their axes.

It is apparent that the objects enumerated as well as others have been obtained and that I have provided a machine for duplicating intricately blade-like shaped parts, such as impeller blades for turbines, so that the blades can be formed automatically and inexpensively and with the high degree of accuracy and precision required for such pieces. The cutting tools and styli being opposite one another prevent deflection of the thin material engaged thereby so that although the material may be relatively resilient, the work blank is machined with a high degree of accuracy. While the preferred form of the invention has been described in considerable detail, it will be apparent that the invention is not limited to the construction shown and it is my intention to cover hereby all adaptations, modifications and changes therein which come within the practice of those skilled in the art to which the invention relates and the scope of the appended claims.

Having thus described my invention, I claim:

1. In apparatus for machining turbine blades, a rotatable template holder, a blank holder rotatable about an axis offset from but parallel to the axis of rotation of said template holder, a pair of combination tracer and tool carriers, means for supporting said combination tracer and tool carriers at opposite sides of said template and blank holders for movement normal to the axes of rotation of said template and blank holders, means for producing relative linear movement between said template and blank holders and said combination tracer and tool carriers in a direction normal to the axes of rotation of said template and blank holders and the direction of movement of said combination tracer and tool carriers, means actuated by said relative linear movement between said template and blank holders and said combination tracer and tool carriers for simultaneously rotating said template and blank holders in timed relation to said movement, each of said combination tracer and tool carriers comprising a tool holder rotatably carried thereby for rotation about an axis generally normal to said relative linear movement between said template and blank holders and said combination tracer and tool carriers and adapted to carry a milling type cutting tool, means for rotating said tool holders, means for yieldably urging said combination tracer and tool carriers towards said template and blank holders with the tracers adapted to engage opposite surfaces of the template at substantially diametrically opposite points and the end milling type cutting tools opposite surfaces of the blank at diametrically opposite points, and means for producing stepped relative movement between said template and tool holders and said combination tracer and tool carriers longitudinally of the axis of rotation of said template and blank holders in timed relation to relative linear movement between said template and blank holders and said combination tracer and tool carriers.

2. In apparatus for machining metal turbine blades, a base, a slide supported on said base for linear movement relative thereto, means for reciprocating said slide, a template holder rotatably supported by said slide for rotation about an axis normal to the path of movement of said slide, a blank holder rotatably supported by said slide for rotation about an axis offset from but parallel to the axis of rotation of said template holder, means actuated by reciprocation of said slide for simultaneously rotating said template and blank holders in timed relation, a pair of combination tracer and tool carriers, means for movably supporting said combination tracer and tool carriers at opposite sides of said template and blank holders, each of said combination tracer and tool carriers comprising a tool holder rotatably carried thereby for rotation about an axis generally normal to the path of movement of said slide and adapted to carrying a milling type cutting tool, means for rotating said tool holders, means for yieldably urging said tracer and tool carriers towards said template and blank holders with the tracers adapted to engage opposite surfaces of the template at substantially diametrically opposite points and the end milling type cutting tools opposite surfaces of the blank at diametrically opposite points, and means for producing stepped relative movement between said slide and said combination tracer and tool carriers longitudinally of the axis of rotation of said template and blank holders in timed relation to the reciprocation of said slide.

3. In apparatus for machining turbine blades, a frame, a slide supported on said frame for linear movement relative thereto, means for reciprocating said slide, a template holder rotatably supported by said slide for rotation about an axis normal to the path of movement of said slide, a blank holder rotatably supported by said slide for rotation about an axis offset from but parallel to the axis of rotation of said template holder, means actuated by reciprocation of said slide for simultaneously rotating said template and blank holders in timed relation, a pair of combination tracer and tool carriers, each of said combination tracer and tool carriers comprising a tool holder rotatably carried thereby for rotation about an axis generally normal to the path of movement of said slide and adapted to carry a milling type cutting tool, means for rotating said tool holders, means for pivotally supporting said combination tracer and tool carriers with their respective tracers and tool holders at opposite sides of said template and blank holders, means for yieldably urging said tracer and tool carriers towards said template and blank holders with the tracers adapted to engage opposite surfaces of the template at substantially diametrically opposite points and the end milling type cutting tools opposite surfaces of the blank at diametrically opposite points, and means for producing stepped relative movement between said slide and said combination tracer and tool carriers longitudinally of the axis of rotation of said template and blank holders in timed relation to the reciprocation of said slide.

References Cited in the file of this patent

UNITED STATES PATENTS

| Number | Name | Date |
|---|---|---|
| 2,204,696 | Ratie | June 18, 1940 |
| 2,397,108 | Hanna et al. | Mar. 26, 1946 |
| 2,425,543 | Landgraf | Aug. 12, 1947 |

FOREIGN PATENTS

| Number | Country | Date |
|---|---|---|
| 430,102 | Great Britain | June 13, 1935 |
| 479,076 | Great Britain | Jan. 31, 1938 |
| 711,854 | Germany | Oct. 3, 1941 |